(12) United States Patent
Botos et al.

(10) Patent No.: US 6,486,574 B2
(45) Date of Patent: Nov. 26, 2002

(54) SMALL FOOTPRINT VERTICAL LIFT AND ROTATION STAGE

(75) Inventors: Stephen J. Botos, Pittsburgh, PA (US); Albert P. Ciez, Murrysville, PA (US); Gerald W. McClain, Pittsburgh, PA (US)

(73) Assignee: Aerotech, Inc., Pittsburgh, PA (US)

( * ) Notice: Subject to any disclaimer, the term of this patent is extended or adjusted under 35 U.S.C. 154(b) by 67 days.

(21) Appl. No.: 09/812,234

(22) Filed: Mar. 19, 2001

(65) Prior Publication Data

US 2002/0130560 A1 Sep. 19, 2002

(51) Int. Cl.[7] .............................. H01L 21/68; G03F 9/00
(52) U.S. Cl. ........................ 310/12; 361/144; 359/393; 108/138; 35/568; 74/479.01
(58) Field of Search ............................ 310/12, 13, 14; 361/144, 146; 359/393; 108/138; 33/568, 1 M; 74/479.01; 378/131, 132

(56) References Cited

U.S. PATENT DOCUMENTS

| | | | |
|---|---|---|---|
| 5,042,902 A | * | 8/1991 | Huebscher et al. ............ 385/72 |
| 5,134,676 A | * | 7/1992 | Boillot et al. .................. 385/72 |
| 5,731,641 A |   | 3/1998 | Botos et al. ..................... 310/12 |
| 6,186,024 B1 | * | 2/2001 | Leiber ........................ 74/490.9 |
| 6,293,081 B1 | * | 9/2001 | Grulick et al. ................ 57/293 |

OTHER PUBLICATIONS

Aerotech, Inc. catalog entitled "Automation Solutions for the Fiber–Optics Industry", pp. 1–20 (date unknown).

* cited by examiner

Primary Examiner—Nestor Ramirez
Assistant Examiner—Judson H. Jones
(74) Attorney, Agent, or Firm—Webb Ziesenheim Logsdon Orkin & Hanson, P.C.

(57) ABSTRACT

A small footprint vertical lift and rotary positioning stage comprises a bottom wedge and a top wedge, a linear bearing between the bottom wedge and the top wedge, cam grooves and cam surfaces for constraining the motion of the top wedge in a vertical direction, a brushless linear motor for moving the bottom wedge back and forth along a horizontal path raising and lowering the top wedge, a circular table rotatably mounted on the top wedge and having a first cylindrical flange extending downward from a segment of the circumference of the circular table, a bracket mounted on the side of the top wedge, the bracket supporting an upwardly extending second cylindrical flange coaxial with the circular table and the first cylindrical flange, and a brushless curvilinear motor between the first and second cylindrical flanges.

12 Claims, 6 Drawing Sheets

US 6,486,574 B2

SMALL FOOTPRINT VERTICAL LIFT AND ROTATION STAGE

FIELD OF THE INVENTION

This invention relates to the field of direct drive vertical lift and rotation stages for precision motion control. More specifically, it relates to small footprint linear and curvilinear motor driven positioning stages useful in the alignment of optic fibers.

BACKGROUND OF THE INVENTION

Optic fibers are being used more and more for the transfer of information due to the large bandwidth and insensitivity to certain types of electromagnetic interference. Optic fibers are transparent glass fibers through which light waves encoded with information are passed. The fibers themselves are often less than 100 nm in diameter. Typically, they are enclosed in a protective coating. The fibers are not infinitely long and, therefore, it is necessary to align and bond fibers together. The alignment must be very precise, that is, the centers of the fibers must be aligned in order to minimize power loss across a bonded joint. Not only must the fibers be joined end to end, fibers must be connected to tiny components, such as transmitters, amplifiers and receivers. This process is referred to in the industry as pig-tailing.

In order to position fibers for fiber-to-fiber bonding or pig-tailing automatically, mechanical positioning stages with extremely high resolution and repeatability are required. Very often the bonding and pig-tailing take place in clean rooms. The expense of building and maintaining clean rooms is directly related to the volume of the room. Hence, miniaturization of the mechanical positioning stages for use in optic fiber alignment is extremely critical.

While linear motor driven vertical lift stages have been successfully implemented as disclosed in U.S. Pat. No. 5,731,641, the small footprint requirement for fiber alignment applications and the need to associate a rotation stage over the vertical lift stage has created the need for the advances disclosed herein.

SUMMARY OF THE INVENTION

It is an advantage, according to the present invention, to provide a small footprint vertical lift and rotation stage driven by linear and curvilinear motors that have high speed, high accuracy, high repeatability and high position stability making them a superior choice for fiber alignment applications.

Briefly, according to the present invention, there is provided a small footprint vertical lift and rotary positioning stage comprising a base plate, first and second side plates perpendicular to the base plate and fixed near opposite edges of the base plate, a bottom wedge, and a top wedge. The bottom (or drive) wedge has a bottom face parallel with the base plate and an upper face forming an angle alpha with the bottom face. The top (or carriage) wedge has a top face parallel with the base plate and a lower face forming an angle alpha with the top face.

A first linear bearing is positioned between the base plate and the bottom face of the first wedge. A second linear bearing is positioned between the upper face of the bottom wedge and the lower face of the top wedge. Cam grooves are provided in the first plate having cam surfaces for receiving cam follower rollers journaled to the top wedge. The cam surfaces and cam follower rollers constrain the motion of the top wedge in a direction perpendicular to the base. A brushless linear motor comprising an armature winding is fixed to the second side plate. A rare earth magnet track is fixed to the bottom wedge for moving the bottom wedge back and forth along a path constrained by the first linear bearing. As the bottom wedge moves back and forth due to the geometry of the wedges and the cam surfaces and cam rollers, the top wedge is raised and lowered. A linear encoder comprises an encoder reader fixed relative to the base plate and an encoder scale fixed to the bottom wedge extending parallel to the base plate in the direction of travel of the bottom wedge. A rotating stage has a circular plate fixed to the top surface of the top wedge and a circular table rotatably mounted to the circular plate. The table has a first cylindrical flange extending downward from a segment of the circumference of the table outside of one of the side plates. A bracket is mounted on the side of the top wedge extending outwardly of one of the side plates. The bracket supports an upwardly extending second cylindrical flange coaxial with the circular table and the first circular flange. A brushless curvilinear motor comprises an armature winding fixed in the second cylindrical flange and a rare earth magnet track fixed in the first cylindrical flange. An encoder comprising an encoder reader is mounted on the top of the top wedge adjacent the circumference of the table and an encoder scale is mounted on the circumferential edge of the table.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Referring now to FIGS. 1 to 5, the vertical lift stage has a base plate 1 which is generally rectangular and has at least two substantially parallel edges. In the embodiment being described, the footprint of the base plate is 115×70 mm. Rising perpendicular from the base plate at one of the parallel edges is a wall comprised of three plates being two space plates 4 and 5 that define vertical cam surfaces and a protective wall 2. Rising perpendicular from the base plate at the other parallel edge is a plate 3 for supporting armature windings to be described.

Figure 1:
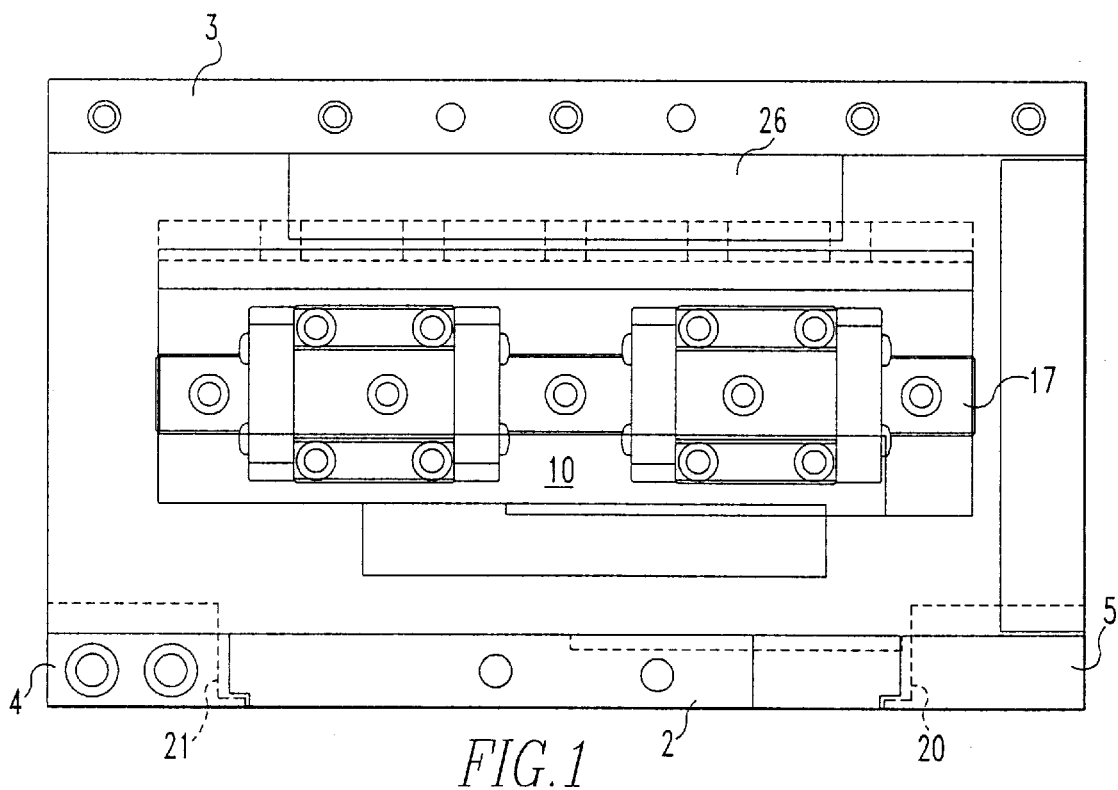
FIG. 1 is a top view of a vertical lift stage, according to the present invention, with the top wedge and cam followers removed with the linear bearing between top and bottom wedges exposed.
Figure 2:
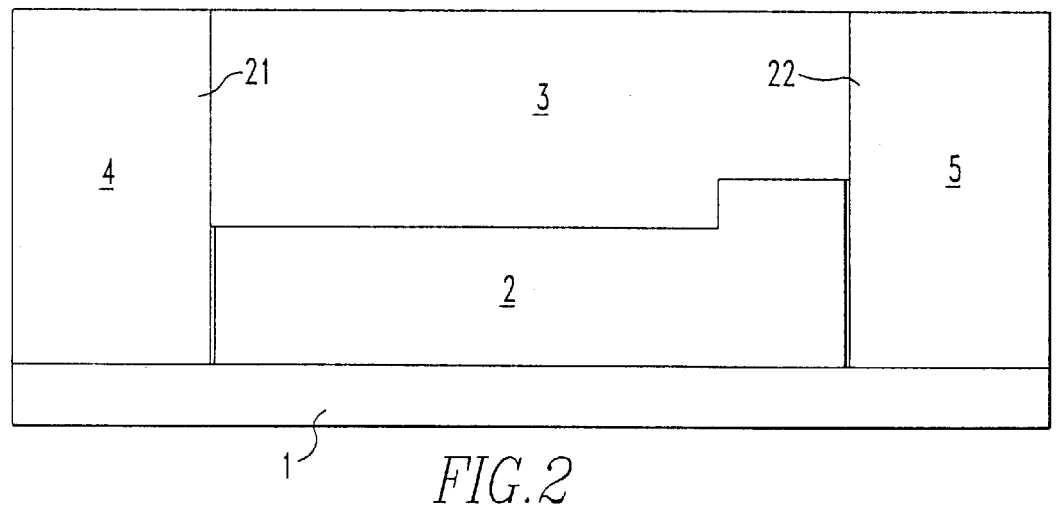
FIG. 2 is a side view of the vertical lift stage with the top and bottom wedges removed.
Figure 3:
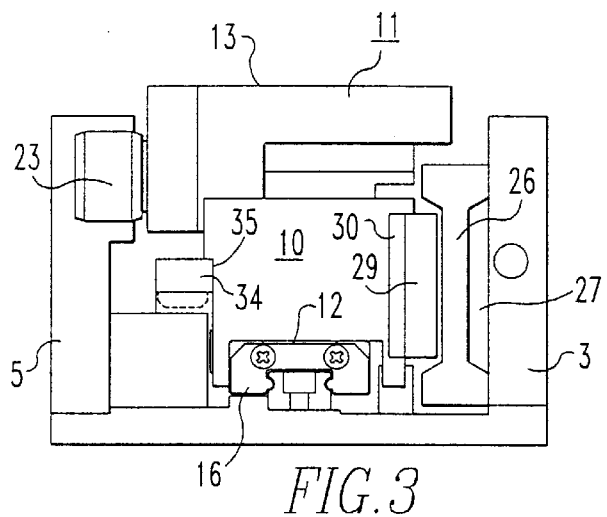
FIG. 3 is an end view of the vertical lift stage with one side plate removed to show one of the vertical cam surfaces and a cam follower roller.
Figure 4:
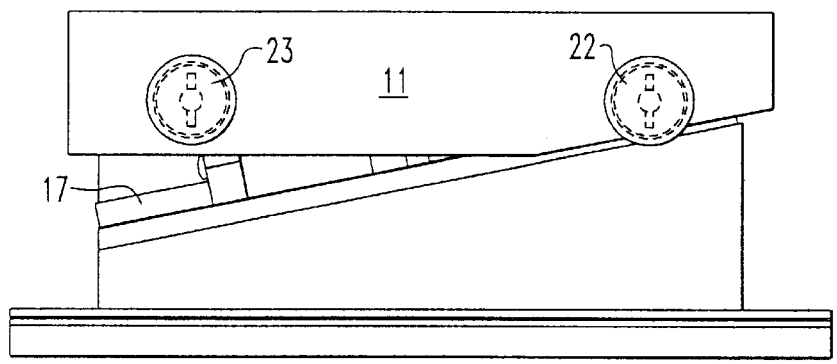
FIG. 4 is a side view of the vertical lift stage with the side plates supporting the cam surfaces removed.
Figure 5:
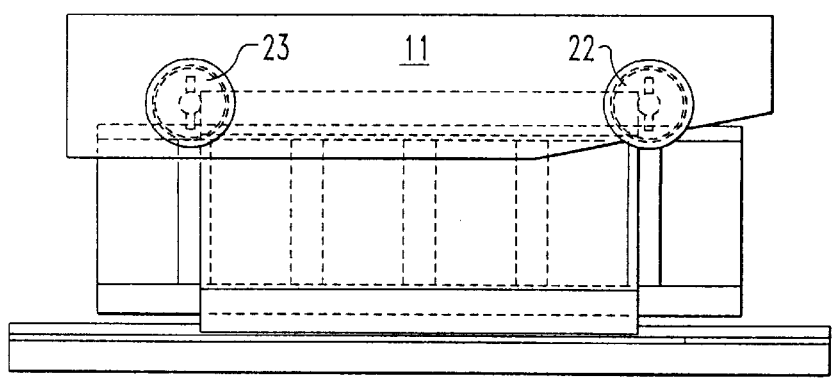
FIG. 5 is a side view of the vertical lift stage with the side plate supporting the cam surfaces and the bottom wedge removed to show the location of the armature winding and the magnet track.
Figure 6A:
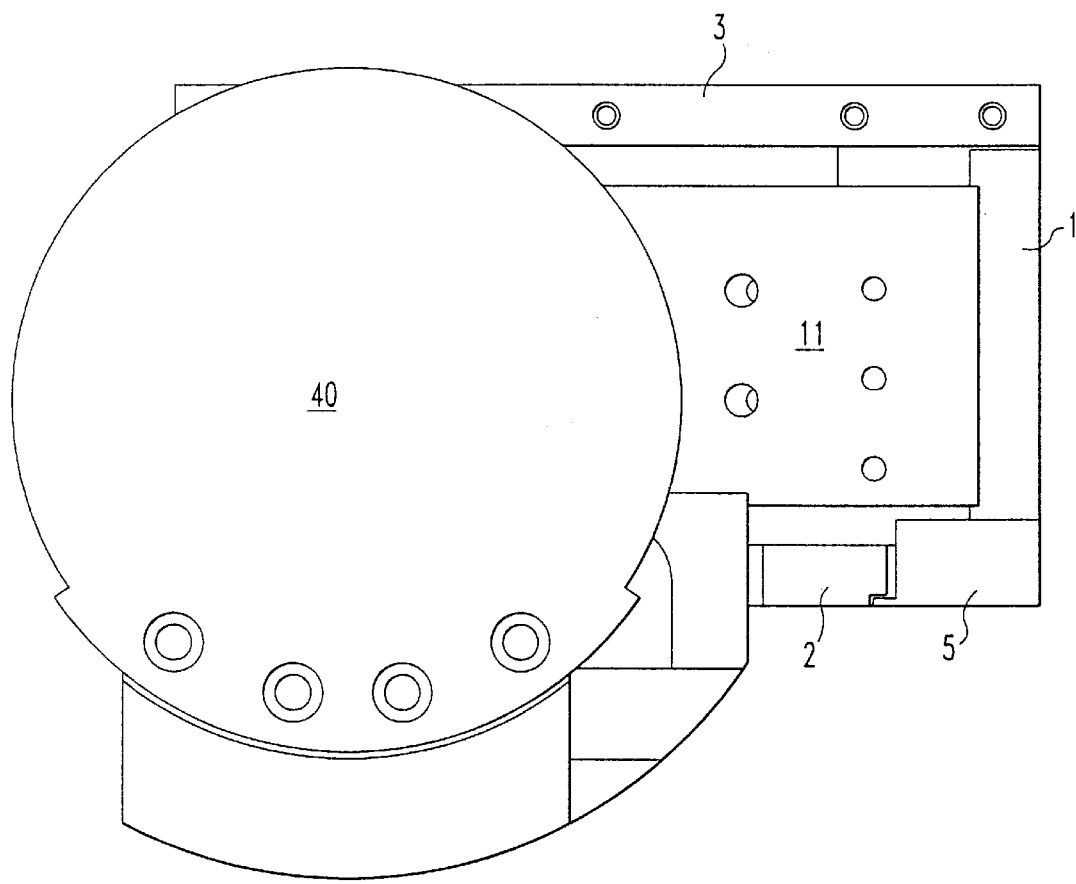
FIG. 6A is a top view of a vertical lift and rotation stage, according to the present invention, with the encoder for the rotation stage removed.
Figure 6B:
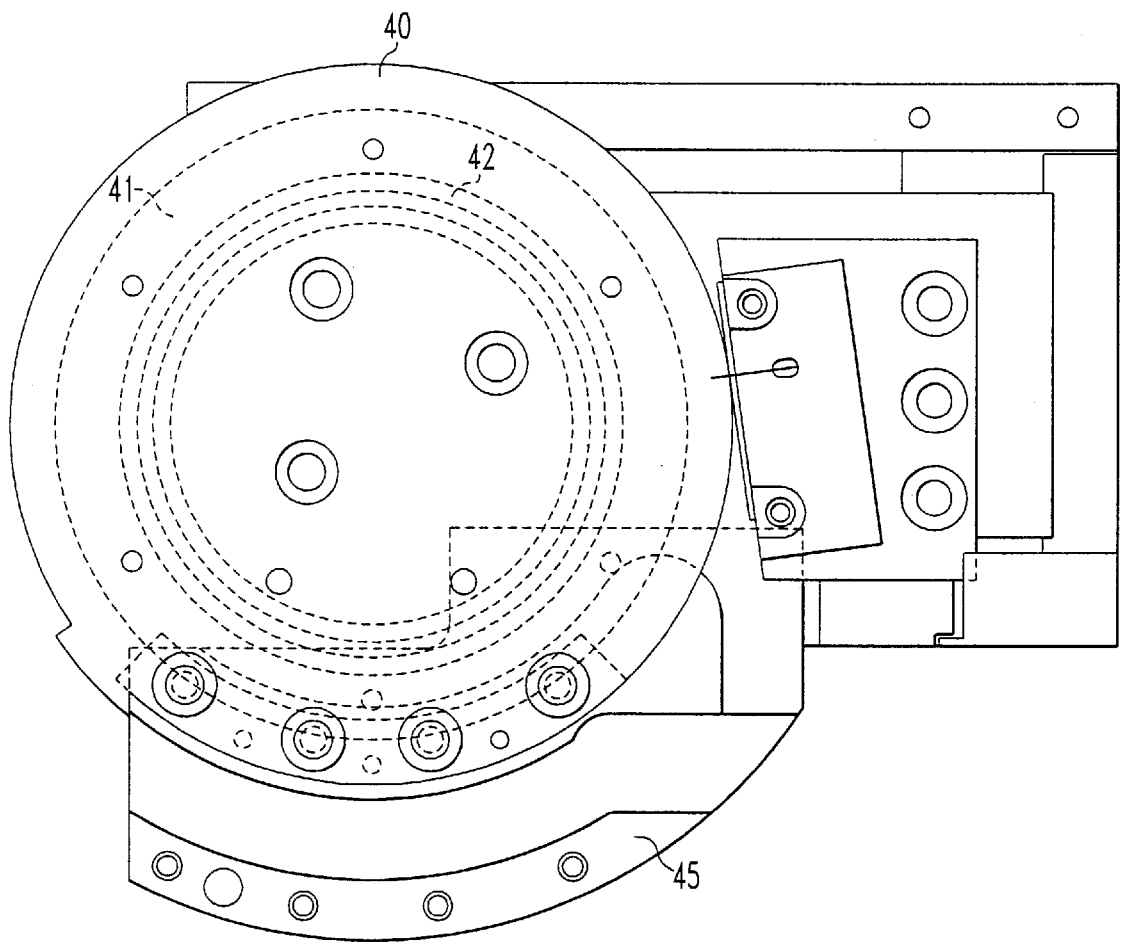
FIG. 6B is a top view of the vertical lift and rotation stage with the armature winding for the rotating stage removed.
Figure 7A:
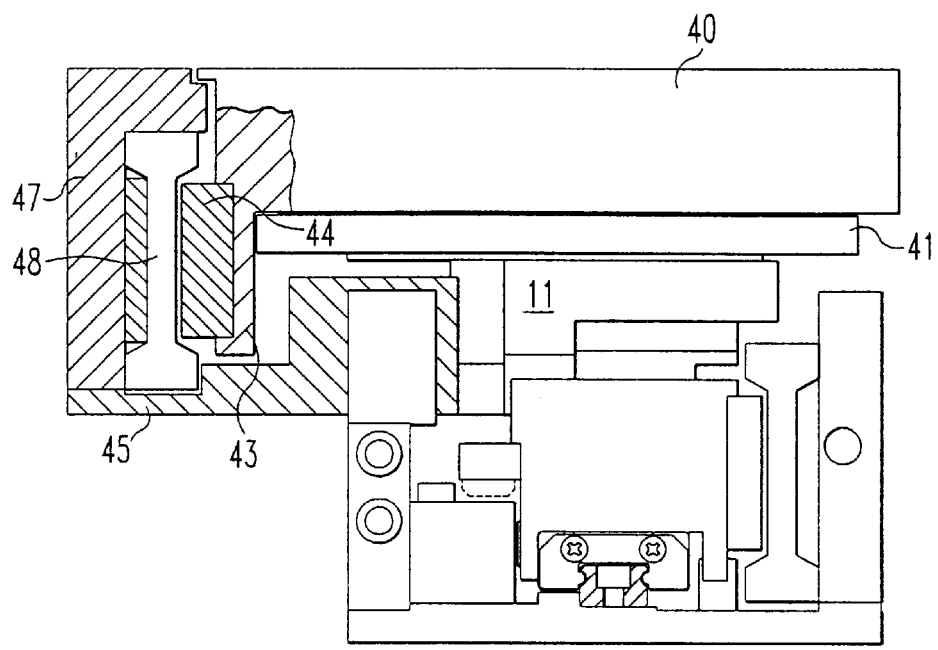
FIG. 7A is an end view of the vertical lift and rotation stage with the armature winding and a part of the magnet track for the rotation stage shown in section.
Figure 8A:
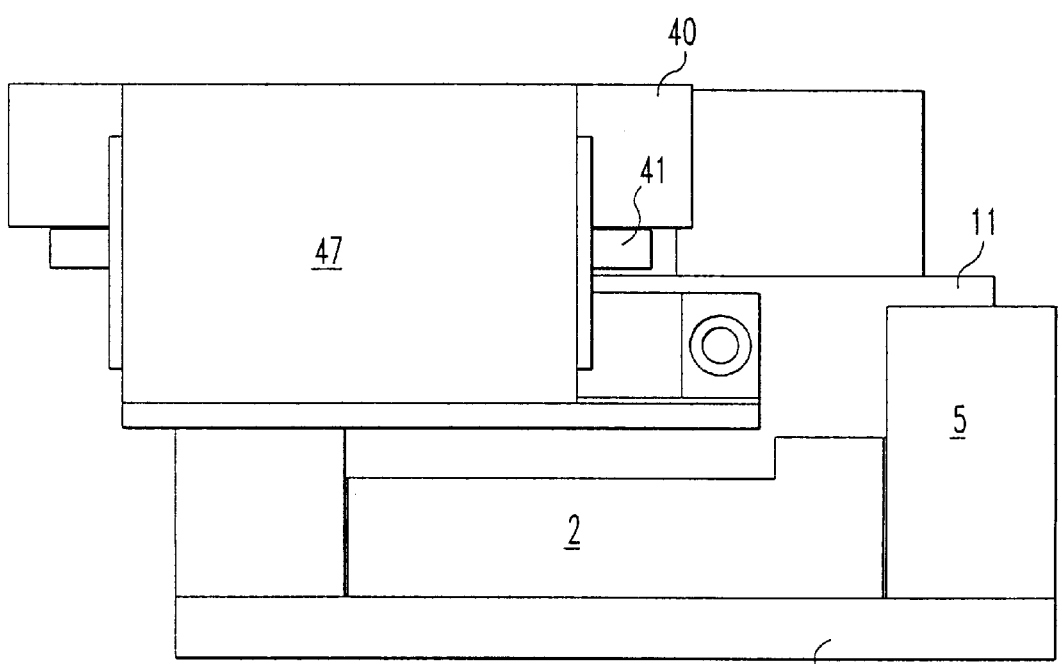
FIG. 8A is a side view of the vertical lift and rotation stage.
Figure 7B:
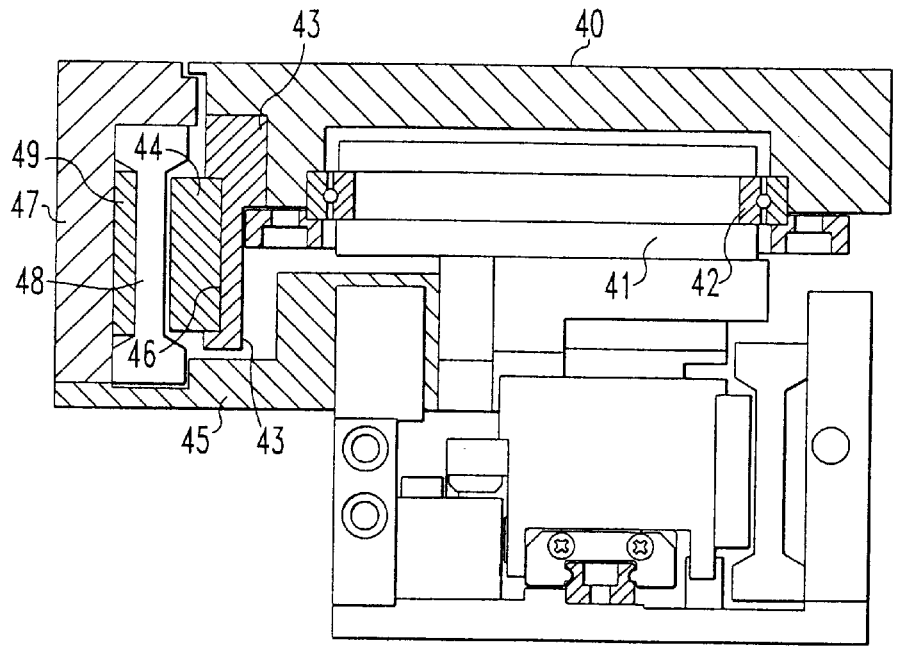
FIG. 7B is an end view of the vertical lift and rotation stage with the armature winding for the rotation stage and the rotating table shown in section.
Figure 8B:
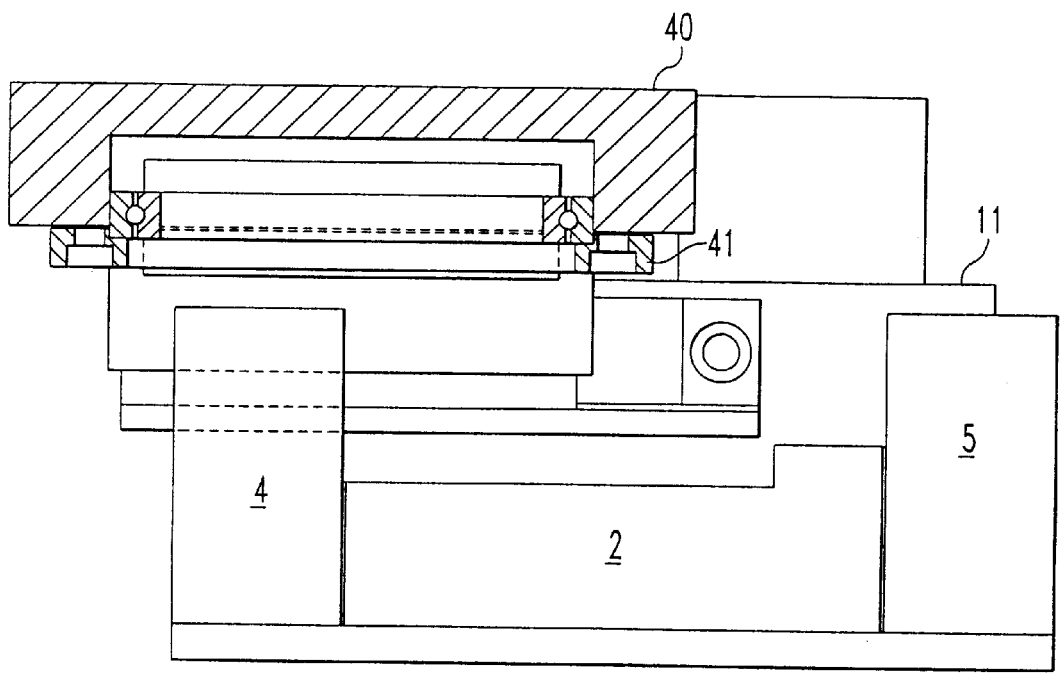
FIG. 8B is a schematic side view of the vertical lift and rotation stage to show the positions of the magnet track and armature windings.

The vertical lift stage comprises a bottom wedge 10 that moves horizontally and a top wedge 11 that moves vertically. The bottom wedge has a bottom face 12 that is parallel with the base plate 1 and an upper face forming an angle with the bottom face. In the illustrated embodiment, the angle is defined by a rise over run of about 1 to 5. The rise over run might be in the range 1 to 2 to 1 to 10, for example. A linear bearing 16 is positioned between the bottom face of the bottom wedge and the base plate. The top wedge has a top face that is parallel with the base and a lower face forming an angle with the top face. The angle is the same as formed by the top wedge. A linear bearing 17 is positioned between the top and bottom wedges. Cam follower rollers 22, 23 are journaled on axles fixed in the top wedge. They bear upon cam surfaces 21 and 22 on spaced plates 4 and 5 (see FIGS. 1 and 2). Hence, horizontal motion of the bottom wedge 10 to the left as seen in FIG. 5 will result in upward vertical motion of the top wedge 11. A 10 mm shift in either direction will result in a lifting or lowering of the stage by about 2 mm. A 4 mm vertical movement is adequate for fiber optic alignment applications.

A brushless permanent magnet linear motor is mounted between the side plate 3 and the bottom wedge. An armature winding 26 is fixed to the side plate 3. The armature winding is 90 mm long×35 mm high. The individual legs of the three-phase slotless bifurcated winding are approximately 4 mm wide. Mounted to the side of the bottom wedge is a rare earth permanent magnet track 29. Because the linear motor is brushless, that is, electronically commutated, Hall effect sensors are mounted to generate commutation signals as the Hall effect sensors encounter the changing polarity of the magnet track.

Preferably, the base, wedges and side plates are all machined from aluminum and aluminum alloys to minimize mass. This will reduce the inertia of a multi-axis stage assembled by mounting the vertical lift stage on an X-Y positioning stage, such as is described in an application entitled "Small Footprint Direct Drive Mechanical Positioning Stage", U.S. patent application Ser. No. 09/812,241 filed on Mar. 19, 2001 and assigned to a common assignee. The disclosure of that application is incorporated herein by reference.

A focusing magnetic plate 27 is fixed behind the armature winding where the side plate to which it is affixed is machined from a nonmagnetic material, such as aluminum. Likewise, a focusing magnet plate 30 is positioned between the permanent magnet track and the bottom wedge.

The linear position of the bottom wedge is precisely controlled by feedback from a linear encoder. A linear encoder reader 34 is positioned alongside the bottom wedge. An encoder scale 35 is mounted on the bottom wedge. A suitable encoder reader comprises an RGH 22 read head manufactured by Renishaw Company along with Renishaw's 20 micron RGS-S tape scale. This encoder reader tape combination can provide an output resolution of 50 nm. The resolution can be further increased with the use of an encoder multiplier, such as the MX Series multipliers manufactured by Aerotech, Inc. of Pittsburgh, Pennsylvania. With the 1 to 5 rise to run ratio, the vertical position of the top wedge can be controlled with a resolution of 4 nm or even 2 nm.

With reference to FIGS. 6A, 6B, 7A, 7B, 8A and 8B, the rotation stage will now be described. A rotatable table 40 is mounted above the top wedge 11 to move up and down with the top wedge. The table has a diameter of 90 mm. Below the table 40 is a circular base plate 41 that is affixed to the top wedge 11. A circular bearing track 42 is positioned between the table 40 and the base plate 41. Suitable turntable bearings are available from Kaydon Corporation.

Extending down from a circumferential edge of the table 40 is a cylindrical flange 43 for supporting a curved magnet track 44 and magnetic focusing plate 46 of a brushless permanent magnet motor for rotating the table 40 through about 10° in either rotational direction. The magnets in the magnet track have an outer radius of about 50 mm (1.96 inches) and extend in an arc of about 90° (80 mm circumferential length).

A bracket 45 is fixed to the side of the top wedge 11 and extends outwardly across the side plates 2, 4, 5 to support a cradle 47 that holds the armature windings 48 and magnetic focusing plate 49 of the permanent magnet motor. The armature winding has an inner radius just larger than the outer radius of the magnet track and extends through an arc of about 77° (70 mm circumferential length). The motor for rotating the table is substantially identical to the motor for moving the bottom wedge, except it is curved and not straight. The manner in which the motor for rotating the table hangs down from the top of the table minimizes the total height of the vertical and rotating stage so that it is between 70 and 80 mm high.

The angular position of the table is precisely controlled by encoder feedback. The encoder reader 56 is mounted on the upper face of the top wedge. The encoder scale 57 is mounted on the cylindrical edge 58 of the rotatable table. With the encoder read head and encoder scale (which is available as a flexible tape) described above, the resolution of the rotatable table is 0.09 arc-sec T or even 0.045 arc-sec T.

Having thus described our invention with the detail and particularity required by the Patent Laws, what is desired protected by Letters Patent is set forth in the following claims.

What is claimed is:

1. A small footprint vertical lift and rotary positioning stage comprising:

a base plate;

first and second side plates perpendicular to the base plate and fixed near opposite edges of the base plate;

a bottom wedge and a top wedge, said bottom wedge having a bottom face parallel with the base plate and an upper face forming an angle alpha with the bottom face, said top wedge having a top face parallel with the base plate and a lower face forming an angle alpha with the top face;

a first linear bearing between the base plate and the bottom face of the first wedge;

a second linear bearing between the upper face of the bottom wedge and the lower face of the top wedge;

cam grooves in the first plate having cam surfaces for receiving cam follower rollers journaled to the top wedge for constraining the motion of the top wedge in a direction perpendicular to the base;

a brushless linear motor comprising an armature winding fixed to the second side plate and a rare earth magnet track fixed to the bottom wedge for moving the bottom wedge back and forth along a path constrained by the first linear bearing and in consequence thereof raising and lowering the top wedge constrained by the cam surfaces and cam rollers;

a linear encoder comprising an encoder reader fixed relative to the base plate and an encoder scale fixed to the bottom wedge extending parallel to the base plate and the direction of travel of the bottom wedge;

a rotating stage having a circular plate fixed to the top surface of the top wedge;

a circular table rotatably mounted to the circular plate and having a first cylindrical flange extending downward from a segment of the circumference of the circular table;

a bracket mounted on the side of the top wedge, said bracket supporting an upwardly extending second cylindrical flange coaxial with the circular table and the first cylindrical flange;

a brushless curvilinear motor comprising an armature winding fixed in the second cylindrical flange and a rare earth magnet track fixed in said first cylindrical flange; and an encoder comprising an encoder reader mounted on the top wedge adjacent the circumference of the rotating table and an encoder scale mounted on the circumferential edge of the circular table.

2. The positioning stage according to claim 1, wherein the armature windings are slotless three-phase bifurcated windings.

3. The positioning stage according to claim 1, wherein the armature windings and magnet tracks are backed up by a magnetic focusing plate.

4. The positioning stage according to claim 1, wherein the magnetic pole pitch of the magnet track is less than about 16 mm.

5. The positioning stage according to claim 1, wherein the armature windings have a coil width of less than about 4 mm.

6. The positioning stage according to claim 1, wherein the curvilinear motor for the circular table has an armature winding at least 50 mm long and a magnet track at least 70 mm long.

7. A small footprint vertical lift positioning stage comprising:

a base plate;

first and second side plates perpendicular to the base plate and fixed near opposite edges of the base plate;

a bottom wedge and a top wedge, said bottom wedge having a bottom face parallel with the base plate and an upper face forming an angle alpha with the bottom face, said top wedge having a top face parallel with the base plate and a lower face forming an angle alpha with the top face;

a first linear bearing between the base plate and the bottom face of the first wedge;

a second linear bearing between the upper face of the bottom wedge and the lower face of the top wedge;

cam grooves in the first plate having cam surfaces for receiving cam follower rollers journaled to the top wedge for constraining the motion of the top wedge in a direction perpendicular to the base;

a brushless linear motor comprising an armature winding fixed to the second side plate and a rare earth magnet track fixed to the bottom wedge for moving the bottom wedge back and forth along a path constrained by the first linear bearing and in consequence thereof raising and lowering the top wedge constrained by the cam surfaces and cam rollers; and a linear encoder comprising an encoder reader fixed relative to the base plate and an encoder scale fixed to the bottom wedge extending parallel to the base plate and the direction of travel of the bottom wedge.

8. The positioning stage according to claim 7, wherein the armature winding is a slotless three-phase bifurcated winding.

9. The positioning stage according to claim 7, wherein the armature winding and magnet track are backed up by a magnetic focusing plate.

10. The positioning stage according to claim 1 or 7, further comprising a home sensor and limit switches.

11. The positioning stage according to claim 1 or 7, having Hall effect sensors to generate commutation signals.

12. The positioning stage according claim 1 or 7, wherein the linear motor for the bottom wedge has an armature winding at least 60 mm long and a magnet track at least 90 mm long.

* * * * *